June 1, 1954

L. N. SCHWIEN ET AL 2,679,712

REMOTELY CONTROLLED VEHICLE

Filed Sept. 7, 1948

INVENTORS
LEO N. SCHWIEN
KENNETH W. BROWN

June 1, 1954     L. N. SCHWIEN ET AL     2,679,712
REMOTELY CONTROLLED VEHICLE

Filed Sept. 7, 1948     2 Sheets-Sheet 2

INVENTORS
Leo N. Schwien
Kenneth W. Brown

Patented June 1, 1954

2,679,712

UNITED STATES PATENT OFFICE 2,679,712

REMOTELY CONTROLLED VEHICLE

Leo N. Schwien and Kenneth W. Brown, Los Angeles, Calif., assignors, by mesne assignments, to Structo Manufacturing Company, Freeport, Ill.

Application September 7, 1948, Serial No. 48,102

3 Claims. (Cl. 46—210)

This invention relates to toy vehicles, and has particular reference to a vehicle which is self-propelled and which may be controlled both as to speed and direction of movement from a point remote from the vehicle.

Heretofore toy vehicles which are adapted to be controlled from a remote point have usually been provided with a self-contained and self-powered motive power plant for causing rotation of the driving wheels of the vehicle while the steering of the vehicle has either been by reason of a pre-set arrangement of the steering wheel or, where it was desired to control the movement of the vehicle by controlling the steering wheel from a remote point, a complicated structure of steering wheel control and power transmitting system, usually a wireless transmission, has been used. The use of such wireless structure has the disadvantage of being expensive and that it can only be employed in the laboratory models or models which have a commercial purpose over and above their entertainment value.

Also, the self-contained and self-energized power plants employed to actuate the driving wheels of a toy vehicle have been either of the spring motor type or of the internal combustion engine type. Of these, the first is unsatisfactory because of the limited amount of power which can be stored in the spring of a spring motor, and the latter is not satisfactory for the reason that it also is expensive and is not readily adapted for use by relatively small children.

It is therefore an object of this invention to provide a vehicle, particularly a vehicle of the self propulsion type constructed to represent a miniature automobile, truck, or other similar vehicle capable of moving forwardly or rearwardly, and of being steered in any desired direction, and in which the motive power and steering control are supplied with a minimum of cost.

Another object of this invention is to provide a vehicle of the type described in the preceding paragraph wherein the motive power is supplied to the driving motor through a cable which connects the vehicle to a control box adapted to be located at a point remote from the vehicle.

Another object of the invention is to provide a steering wheel control for tractor type vehicles in which the control power is supplied to the vehicle by means of a cable which connects the vehicle with a control box.

Another object of this invention is to provide a vehicle of the character set forth in which electromotive power means is employed for driving the driving wheels of the vehicle and for controlling the direction of the dirigible steering wheels of the vehicle, the power to the electromotive means being supplied through a flexible cable which connects the vehicle with a remotely located control station.

Other objects and advantages of the invention will be apparent from the following description and claims, considered together with the accompanying drawings, in which:

Figure 1:
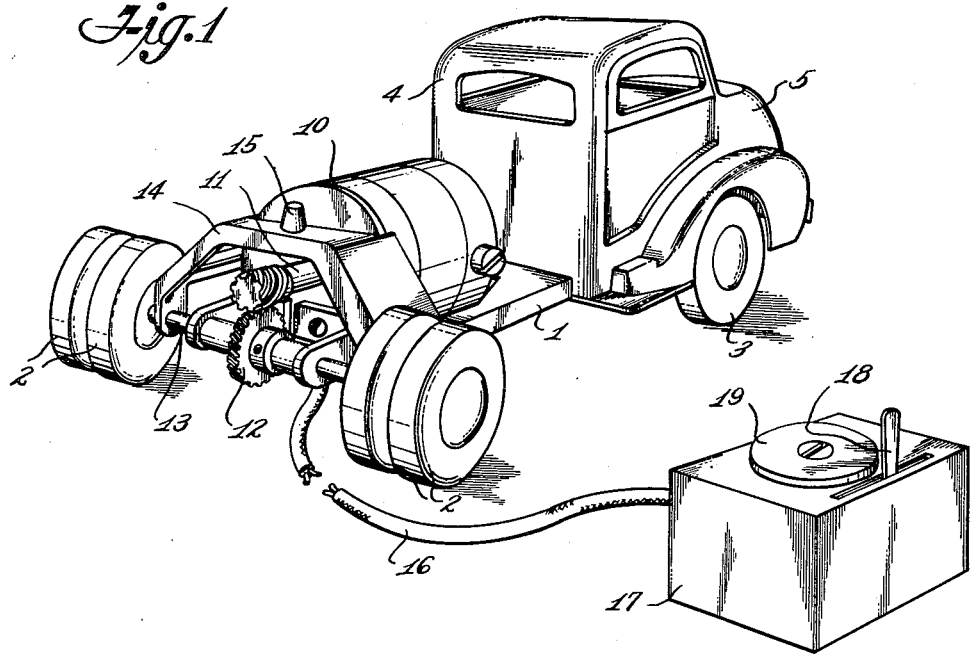
Fig. 1 is a perspective view of a toy vehicle and control box constructed in accordance with the invention.

Referring to the drawings, there is illustrated a tractor type vehicle which, as will be understood by those skilled in this art, may be of any suitable type. Preferably the vehicle for amusement purposes will be a miniature replica of an automobile of the passenger car or truck type, and the vehicle illustrated in Fig. 1 has been selected as of the tractor type to which a detachable truck body may be secured.

The vehicle comprises a suitable chassis 1 having driving wheels 2 and dirigible steering wheels 3. A representation of a driver's cab 4 and a hood 5 may be utilized to house and conceal an electromotor 6, the shaft 7 of which will operate a steering member 8 which in turn connects to the steering knuckles 9 for the dirigible wheel axles.

To the rear of the cab is an electric motor 10, the shaft 11 of which carries a worm meshing with a gear 12 suitably secured to the driving axle 13 on which the driving wheels 2 are mounted, at least one of the latter being suitably secured to the axle 13. The gearing between the motor shaft and the rear driving axle is preferably of the worm and wheel type, though it will be understood by those skilled in this art that any suitable driving connection between the motor 10 and the driving axle 13 will be satisfactory.

In the particular form of tractor vehicle illustrated in Fig. 1, a truck body mounting structure is provided including a bracket 14 which extends across the gearing 12 and is provided with a kingpin 15 to pivotally receive the forward end of the truck body or trailer.

The motive power for operating the steering motor 6 and the driving motor 10 is supplied through a cable 16 which is preferably very light and flexible and contains a sufficient number of conductors to permit of controlling the driving motor 10 in a forward and rearward direction selectively and also a sufficient number of conductors to permit the controlling of the dirigible wheels 3 in either the right-hand or left-hand direction.

At some convenient point remote from the location of the vehicle there is provided a control box 17 which may include a suitable connection to the ordinary home current supply, or may contain batteries if it is desired to make the unit completely self-contained.

The control box is provided upon its exterior with control elements 18 and 19 for performing the control functions. The handle 18 may be moved forwardly or backwardly to control the direction and the speed of the driving motor 10 to thereby drive the vehicle forwardly or rearwardly at any desired speed, while returning the handle 18 to its central position as indicated in Fig. 1 will cause the vehicle to stop.

The handle or knob 19 may be in the form of a disk or wheel which may be rotated in either direction to thereby cause the steering motor 6 to turn the dirigible wheels of the vehicle to a desired angle in either a right-hand or left-hand direction by clockwise or counterclockwise rotation, respectively, of the knob 19.

Figure 2:
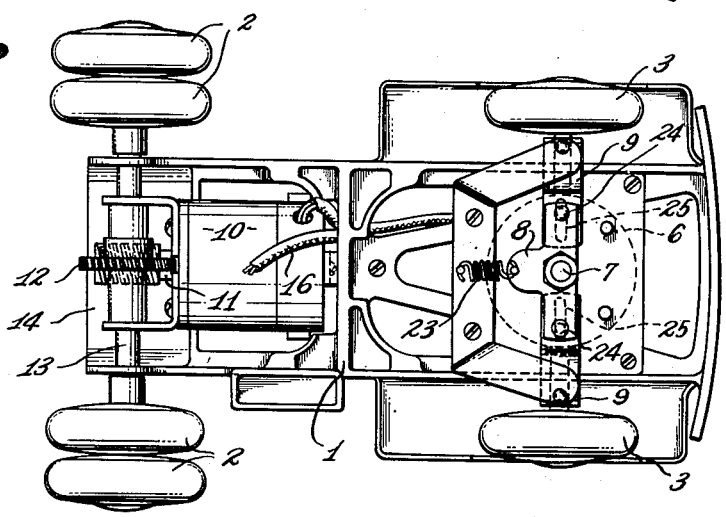
Fig. 2 is a bottom plan view of the vehicle shown in Fig. 1 and illustrating the manner in which the dirigible wheels are controlled.
Figure 3:
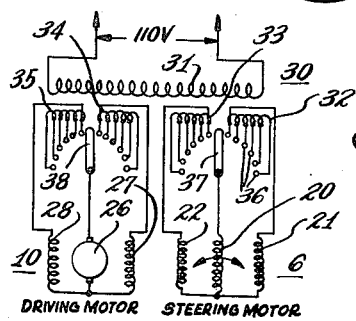
Fig. 3 is a diagrammatic view illustrating the manner in which the electromotive power means for the vehicle may be supplied with current and controlled from the control box.

By referring particularly to Figs. 2 and 3, it will be observed that the steering motor 6 is of the moving coil-wound field type of electromotor, which includes a rotor winding 20 and two stator windings 21 and 22. The steering member 8 is T-shaped as shown in Fig. 2 and is preferably made self-centering by means of a suitable spring 23 connected as shown to the end of the leg of the T so that the degree of deflection of the wheels 3 will depend upon the voltage supplied to the stator and rotor windings, and the direction of the deflection will depend upon which of the stator windings is energized. The T-shaped steering member 8 is connected to the steering knuckles 9 to steer the wheels 3 simultaneously in either direction and to a degree depending upon the angle of oscillation of the steering member 8. The operating connection to each wheel consists of a pin 24 on the outer end of the cross-portion of the T slidable in a slot 25 in the steering knuckle 9 for the adjacent wheel 3. Thus a partial rotation of the motor shaft 7 will cause a simultaneous turning of the dirigible wheels 3 in the desired direction and to the desired degree.

By referring particularly to Fig. 3, it will be observed that the driving motor 10 is of the series-wound type having an armature 26 and a pair of field windings 27 and 28, either of which may be connected in series relation with the armature 26 to thus cause the motor 10 to drive the vehicle forwardly or rearwardly. The speed of the motor will be dependent upon the voltage applied to the armature and field windings so that a reasonably accurate control of the truck speed in either its forward or rearward direction may be accomplished.

The supplying of the power voltages to the motors 10 and 6 and the connection of the desired field winding or stator winding may be readily accomplished as shown in Fig. 3 as by providing within the control box 17 a transformer indicated generally at 30, the primary winding 31 of which is connected to a suitable source of supply indicated by the legend 110 v. The transformer 30 is provided with four secondary windings 32, 33, 34, and 35. Secondary windings 32 and 33 are wound in opposite directions to each other and each is provided with a plurality of taps to connect with contact buttons 36 arranged in an arc over which a control contact brush 37 may sweep from a neutral position as shown in Fig. 3 to a maximum voltage position in either direction.

Thus when the handle or knob 19 is rotated in one direction, the brush 37 will connect with one of the terminals and supply current from the secondary 32 through the armature or rotor 20, one of the stators, and back to the secondary 32. As the brush 37 contacts the first terminal in the direction of its movement, a minimum voltage will be supplied to the motor 6 and a minimum amount of turning of the dirigible wheels will be accomplished, while as the brush 37 sweeps farther over its terminals, higher voltages will be supplied to cause a deflection of the dirigible wheels at a greater angle, but in the same direction.

Similarly, if the brush 37 is moved in the opposite direction by an opposite rotation of the steering handle or knob 19, the dirigible wheels will be deflected in the opposite direction and through an angle dependent upon which of the terminals the brush 37 engages.

Similarly, the secondaries 34 and 35 are connected to the field windings 27 and 28 which are wound in directions opposite to each other so that a brush 38 moved by the handle 18 will connect either secondary 34 with the armataure 26 and field winding 27, or will connect secondary 35 and field winding 28 with the armature 26, the amount of voltage being supplied depending upon the amount of movement of the brush 38 from its normal or neutral position.

Thus from a remote point at which the control box 17 is located, the vehicle may be started and stopped and controlled both as to its forward and backward movements and speed of movement in either direction, and the operator can also accurately control the steering of the vehicle as it traverses any area, limited only by the length of the cable 16.

Figure 4:
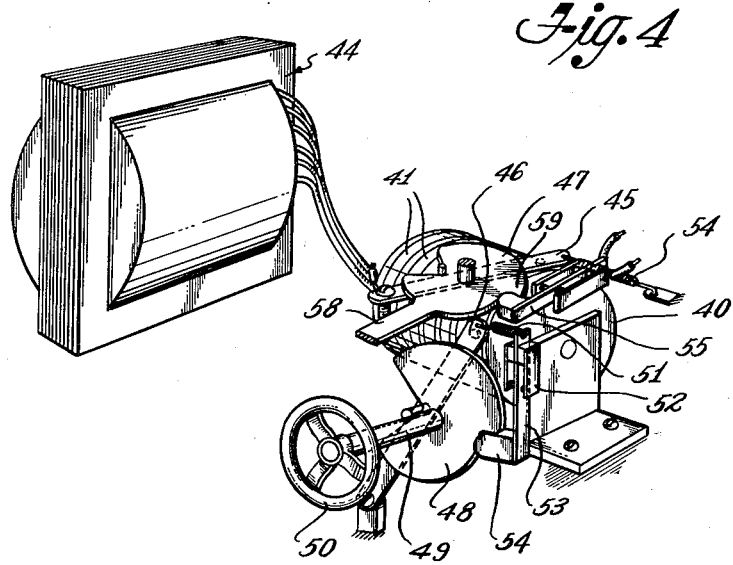
Fig. 4 is a modified form of control apparatus which may be employed in the practice of our invention.

Referring to Fig. 4, we have illustrated a simplified form of control which may be readily employed to control the vehicle of our invention, which comprises a drum 40 provided with a plurality of slip-rings 41 of metal, each one of which is connected to one of the taps 42 of the secondary 43 (see Fig. 5) of the step-down transformer indicated generally by the reference character 44. Arranged to move longitudinally relative to the drum 40 are a pair of contact arms 45 and 46, these contact arms being preferably arranged to be pivoted adjacent the drum 40 so as to be moved over the drum in response to the operation of cams 47 and 48.

The contact arm 46 is arranged in circuit with the steering control and is adapted to be operated by the cam 48 which is in turn mounted upon a suitable shaft 49 having a hand wheel 50 that corresponds to handle or knob 19 extending to the exterior of the cabinet (not shown) but which corresponds in all respects with the control box 17. The arm 46 is provided with a spring 51 which causes the arm 46 to move relative to drum 40 normally in the direction to contact the ring 41 which provides the lowest voltage to the steering motor 6. The shape of the cam 48 is such that as the wheel 50 is rotated the contact arm 46 will be moved farther and farther along the drum 40 to provide increased voltage to the steering motor and thus cause the steering motor to turn to a greater extent to provide the necessary steering for the vehicle.

Arranged adjacent the cam 48 is a reversing switch 52, the mid contact 53 of which is provided with an arm 54 engageable with a portion of the cam 48 so that as the steering wheel 50 is moved in one direction or the other the particular stator winding corresponding to that direction of movement of the vehicle will be energized through the medium of the contact arm 46.

The contact arm 45 is provided with a suitable spring 54 which normally urges it against the face of the cam 47. Thus the control lever 58 that corresponds to handle 18 may be moved to any desired position to control the voltage applied to the driving motor 10 while the direction of movement of the lever will control the direction of the travel of the vehicle by reason of a portion 59 of the cam 47 engaging a reversing switch 55 which will energize one or the other of the field windings of the driving motor 10.

Figure 5:
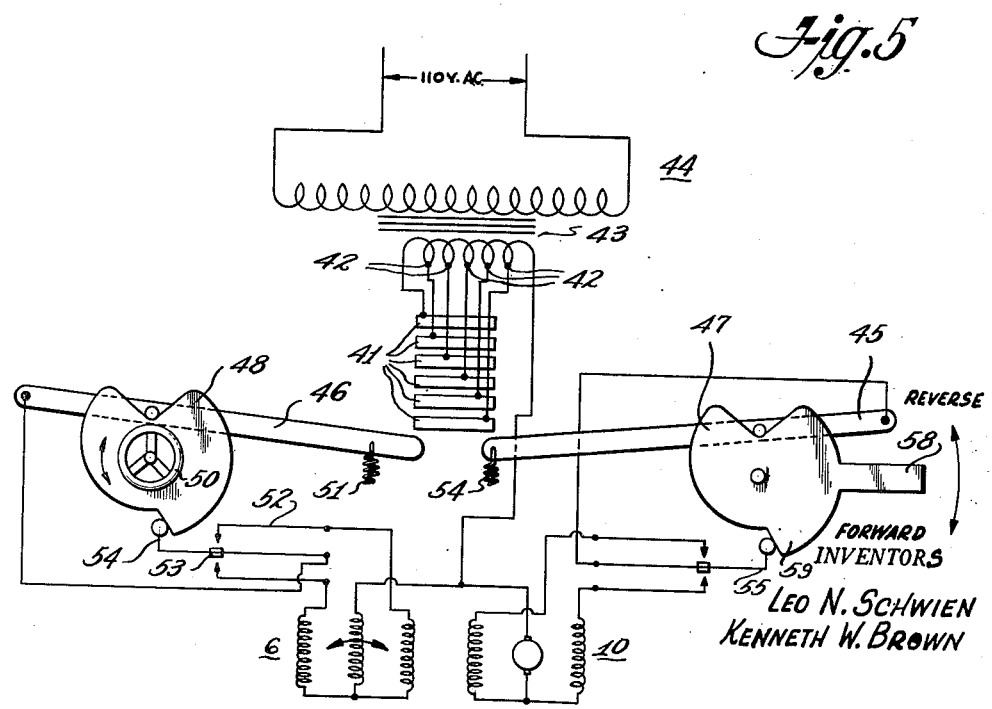
Fig. 5 is a diagrammatic view illustrating the type of control shown in Fig. 4.

The spring 51 will normally urge the contact lever 46 in a direction to deenergize the steering motor 6 as indicated particularly in Fig. 5 so that the rotation of the hand wheel 50 will be such that any movement from its normal position will energize the steering motor in the correct direction and give the correct extent of movement of the dirigible wheels 3. Spring 54 normally urges lever 45 in a direction to de-energize the driving motor 10, as shown in Fig. 5, and movement of the control lever 58 in either direction results in energization of the driving motor 10 in the direction selected and at a speed depending upon the extent of movement of lever 58.

It will be observed from the foregoing that an extremely simple motive power and motive power control is provided for a toy vehicle, permitting the vehicle to be constructed at small expense. Likewise the vehicle is provided with a remote control steering which is extremely simple in its construction and operation, and similarly can be constructed with a minimum of expense.

While there is shown and described the preferred embodiment of the invention, we do not desire to be limited to any of the details set forth herein, except as defined by the terms of the appended claims.

We claim:

1. In a remote control for toy vehicles, a contact drum having a plurality of slip-rings connected, respectively, to successive taps extending from a step-down transformer, two contact arms adapted to be moved back and forth over said slip-rings to engage the same successively, one of said contact arms being connected with an electric motor for driving the vehicle either forwardly or rearwardly at a speed proportional to the voltage supplied by the respective engaged ring, the other of said contact arms being connected to another electric motor employed to operate steering means for steering the vehicle to a degree related to the voltage of the engaged ring, control means for controlling the forward-rearward movement of said vehicle including a manually rotatable cam engageable with said contact arm associated with the driving motor, a reversing switch, means on said last named cam for controlling the reversing switch to determine the direction of said forward-rearward movement in which said vehicle is to travel, spring means urging said contact arm and associated cam to a position supplying no current to said driving motor, means for controlling the steering of said vehicle including another manually rotatable cam associated with the contact arm connected with the steering motor of said vehicle, spring means normally urging said last named contact arm and associated cam to a position supplying no current to said steering motor, and a reversing switch associated with said cam and actuated by movement of said cam for determining the direction in which said steering motor will operate as a result of actuation of said cam associated with said steering means.

2. In a remote control for toy vehicles, a contact drum having a plurality of slip-rings connected, respectively, to successive taps extending from a step-down transformer, a contact arm adapted to be moved back and forth over said slip-rings to engage the same selectively, said contact arm being connected with an electric motor for driving the vehicle either forwardly or rearwardly at a speed proportional to the voltage supplied by the respective engaged ring, control means for controlling the forward-rearward movement of said vehicle including a manually rotatable cam engageable with said contact arm, a reversing switch, means on said cam for controlling the reversing switch to determine the direction of said forward-rearward movement in which said vehicle is to travel, and spring means urging said contact arm and associated cam to a position supplying no current to said driving motor.

3. In a remote control for toy vehicles, a contact drum having a plurality of slip-rings connected, respectively, to successive taps extending from a step-down transformer, a contact arm adapted to be moved back and forth over said slip-rings to engage the same selectively, said contact arm being connected with an electric motor employed to operate steering means for steering the vehicle to a degree related to the voltage of the engaged ring, means for controlling the steering of said vehicle including a manually rotatable cam engageable with said contact arm, spring means normally urging said contact arm and associated cam to a position supplying no current to said steering motor, a reversing switch, and means on said cam for controlling the reversing switch for determining the direction in which said steering motor will operate as a result of actuation of said cam.

References Cited in the file of this patent

UNITED STATES PATENTS

| Number | Name | Date |
|---|---|---|
| 1,332,545 | DeFilippis | Mar. 2, 1920 |
| 1,357,491 | DeFilippis | Nov. 2, 1920 |
| 1,587,083 | Neuzerling | June 1, 1926 |
| 1,780,487 | Jurgensen | Nov. 4, 1930 |
| 1,791,070 | Coggon | Feb. 3, 1931 |
| 1,808,015 | Buchanan-Wollaston | June 2, 1931 |
| 1,856,991 | Franklin | May 3, 1932 |
| 1,866,477 | Moore | July 5, 1932 |
| 1,930,450 | Langas | Oct. 10, 1933 |
| 1,951,505 | Dambrine | Mar. 20, 1934 |
| 1,966,145 | Spotz | July 10, 1934 |
| 2,054,644 | Wulfert | Sept. 15, 1936 |
| 2,519,472 | Howard | Aug. 22, 1950 |

FOREIGN PATENTS

| Number | Country | Date |
|---|---|---|
| 486,408 | Germany | Nov. 23, 1929 |